US012654620B2

(12) United States Patent
Schoonover et al.

(10) Patent No.: US 12,654,620 B2
(45) Date of Patent: Jun. 16, 2026

(54) EXTRUDED RUNNING BOARD

(71) Applicant: Vintech Industries, Inc., Imlay City, MI (US)

(72) Inventors: James C. Schoonover, Shelby Township, MI (US); Kevin J. Weingartz, Imlay City, MI (US)

(73) Assignee: Vintech Industries, Inc., Imlay City, MI (US)

( * ) Notice: Subject to any disclaimer, the term of this patent is extended or adjusted under 35 U.S.C. 154(b) by 478 days.

(21) Appl. No.: 18/166,796

(22) Filed: Feb. 9, 2023

(65) Prior Publication Data
US 2023/0249622 A1 Aug. 10, 2023

Related U.S. Application Data

(60) Provisional application No. 63/308,274, filed on Feb. 9, 2022.

(51) Int. Cl.
B60R 3/00 (2006.01)

(52) U.S. Cl.
CPC .................................... B60R 3/002 (2013.01)

(58) Field of Classification Search
CPC ...................................................... B60R 3/02
See application file for complete search history.

(56) References Cited

U.S. PATENT DOCUMENTS

| | | | |
|---|---|---|---|
| 4,203,611 A | 5/1980 | Makela | |
| 4,257,620 A | 3/1981 | Okland | |
| 4,311,320 A | 1/1982 | Waters et al. | |
| 4,557,494 A | 12/1985 | Elwell | |
| 4,934,721 A | 6/1990 | Flores | |
| 5,806,869 A | 9/1998 | Richards | |
| 6,267,398 B1 | 7/2001 | Lombard | |
| 7,322,593 B2 * | 1/2008 | Smith | B60R 3/002 |
| | | | 280/169 |
| 9,707,898 B1 * | 7/2017 | Dellock | B29C 48/022 |
| 9,937,865 B1 | 4/2018 | Oakey | |
| 10,518,727 B1 | 12/2019 | Barbuta | |
| 11,541,815 B2 | 1/2023 | Schoonover | |
| 2002/0195792 A1 | 12/2002 | Hendrix | |
| 2005/0263974 A1 | 12/2005 | Mulder | |
| 2007/0296175 A1 | 12/2007 | Flanik et al. | |
| 2013/0323454 A1 | 12/2013 | Chapman et al. | |
| 2017/0036596 A1 | 2/2017 | Yang | |
| 2017/0166135 A1 | 6/2017 | Baskin et al. | |
| 2018/0065559 A1 | 3/2018 | Michie et al. | |
| 2018/0170266 A1 * | 6/2018 | Dellock | B29C 48/0013 |
| 2019/0047477 A1 | 2/2019 | Crandall | |
| 2019/0084482 A1 | 3/2019 | Long et al. | |
| 2019/0092226 A1 | 3/2019 | Chen | |
| 2020/0130762 A1 | 4/2020 | Crandall | |
| 2020/0361386 A1 | 11/2020 | Schoonover | |
| 2021/0213884 A1 * | 7/2021 | Dellock | B32B 37/15 |
| 2021/0221449 A1 | 7/2021 | Milani et al. | |
| 2021/0323480 A1 | 10/2021 | Long et al. | |

* cited by examiner

*Primary Examiner* — Bryan A Evans
(74) *Attorney, Agent, or Firm* — Harness, Dickey & Pierce, P.L.C.

(57) ABSTRACT

A multi-layer running board extrusion including a multi-material running board extruded out of a combination of high-performance plastics. The running board is extruded in multiple layers, which optimizes the size and desired performance of the multiple materials to achieve predetermined desired result.

5 Claims, 1 Drawing Sheet

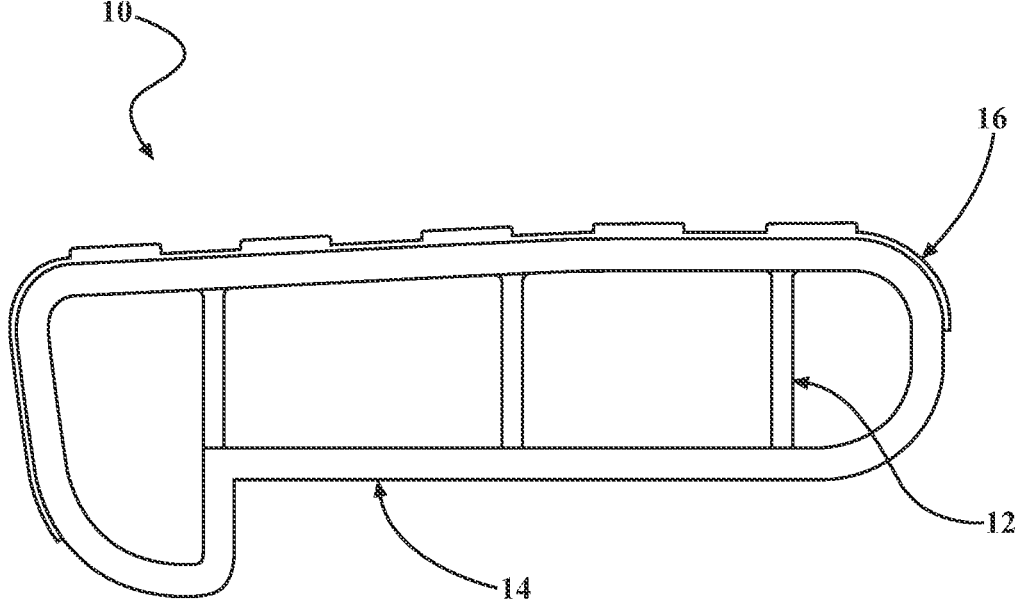

EXTRUDED RUNNING BOARD

CROSS-REFERENCE TO RELATED APPLICATIONS

This application is a Non-Provisional Patent Application and claims benefit of U.S. Provisional Patent Application No. 63/308,274, filed Feb. 9, 2022. The disclosure of the above application is incorporated herein by reference.

FIELD OF THE INVENTION

The present invention relates to an extruded running board with adjustable running board ribs.

BACKGROUND OF THE INVENTION

Running boards are generally known. One typical application is a running board that can be attached to a rocker panel of a vehicle or other vehicle body structure. The industry standards are aluminum, chrome aluminum, steel or molded plastics. Weight is just one common problem. Production expenses and high costs are others. Aluminum extrusions are a primary running board. Another is blow molding running boards, which can only be done using one material and requires expensive tooling.

Accordingly, there is a great need for a running board with improved geometry and adjustability to provide a product that is high performance but at a reduced cost.

SUMMARY OF THE INVENTION

The present invention generally relates to an extruded plastic running board. In accordance with the present invention, there is provided a multi-material running board extruded out of a combination of high-performance plastics. In addition, the running board can be extruded in multi layers which optimizes the size and desired performance of the multiple materials to achieve a desired result. The extruded running board meets predetermined requirements, including predetermined deflection requirements. The present invention allows an extruded running board that is lighter than existing conventional aluminum boards, e.g., generally, at least 5.0 percent lighter, typically at least about 5.0 to 15.0 percent lighter, preferably, about 7.5-8.0 percent lighter. The present invention also allows the extruded running board to be operably cut to any desired length to accommodate various applications and each vehicle platform, e.g., to about 6 feet, about 5 feet, about 3 feet, about 1 foot, or any other suitable length for the particular application, which is another significant advantage over conventional boards.

The present invention provides predetermined running board geometry that incorporates proprietary technology to produce a product that is high performance but at a reduced cost and is lighter weight.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross sectional front elevation view of an extruded running board, in accordance with the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1 generally, in accordance with the present invention, there is provided a multi-material running board extruded out of a combination of predetermined high-performance plastics. In addition, the running board is extruded in a plurality of layers which optimizes the predetermined size and predetermined desired performance of the multiple materials to achieve predetermined desired results (e.g., weight, strength, costs, etc.).

There is provided an extruded running board shown generally at 10, in accordance with the present invention, including a plurality of ribs, indicated generally at 12, and a main body, indicated generally at 14, surrounding the plurality of ribs 12. Most preferably, the main body 14 has a different predetermined material than the plurality of ribs 12. The ribs 12 are generally positioned along the longitudinal length within the main body 14 cavity and are of predetermined length(s) depending on the application, preferably, running substantially the longitudinal length of the main body 14.

The running board has predetermined geometry, especially as to the internal plurality of ribs 12, and incorporates proprietary technology to produce a product that is high performance but at a reduced cost. It is understood that geometry is adapted and suitable for predetermined results depending on the particular applications without departure from the scope of the present invention. By way of non-limiting example, each rib 12 may include at least one integrally formed thicker segment than the remainder of the rib 12.

Extruding in multiple layers optimizes size and desired performance of multiple materials to achieve a desired result. It is understood that the predetermined plurality of materials is suitable for predetermined desired results depending on the particular applications without departure from the scope of the present invention. It is understood that the predetermined size is adapted and suitable for predetermined desired results depending on the particular applications without departure from the scope of the present invention.

Predetermined features provide predetermined desired results, e.g., deflection requirements, wherein the features include but are not limited to, manufacturing process, thickness (e.g., central rib thickness(es) 12, heights, length, and material properties.

The present invention incorporates a plurality of different predetermined materials (e.g., meeting predetermined desired strength and weight requirements) and predetermined varying thickness into the center sections of the profile. By way of non-limiting example, a plurality of thicknesses of various segments of the extruded running board, and different thicknesses depending on the particular applications and predetermined desired properties. According to aspects of the present invention, the extruded running board 10 generally incorporates extruded plastic with a TPV skin coat. The extruded running board 10 typically incorporates reinforced plastic, preferably, glass fiber reinforced polypropylene, more preferably, providing about a 30% glass fiber reinforced polypropylene plastic extrusion with a TPV skin coat.

Preferably, the extruded running board 10 includes the plurality of rib sections 12, e.g., central ribs spanning within the main body 14 of the assembly 10. According to preferred aspects of the present invention, the rib sections 12 thicknesses and material are operably adjustable depending on predetermined performance requirements and particular application (e.g., pickup truck side door(s) running board, cab step, front end step, rear vehicle step, sport utility running board, semi-truck running board, step, military vehicle running board, fixed or deployable running boards, recreational vehicle running board, side cab running board, pickup truck bed step, and etc.

At least one cap layer 16 is operably connected to, or co-extruded with, the main body 14 of the extruded running board 10. The cap layer 16 preferably has a tread design on a step surface for user grip.

The present invention is a multi-material running board 10 extruded out of a combination of predetermined high-performance plastics.

The present invention is unique in that it combines multiple materials to optimize function and minimize cost as well as weight.

The present invention results in light, durable, and functionable running boards.

The present invention provides predetermined extruded running board geometry that incorporates proprietary technology to produce a product that is predetermined high performance but at a reduced cost.

As an all plastic extruded running board 10 body, it is made possible to separate the different areas of the predetermined profile with different predetermined materials creating a unique product.

It is understood that while an extruded running board 10 is shown and described, the present invention is operably adaptable for other components (e.g., any predetermined suitable vehicles, automotive, motor vehicle, mobile home, etc.) depending on the application without departure from the scope of the present invention.

In accordance with the present invention, and referring to FIG. 1 generally, there is provided an all extruded running board 10 and process for manufacturing same. Traditionally, running boards are either metal with plastic components, or molded plastic. Preferably, the running board 10 of the present invention substantially all extruded plastic. Part of what makes this new concept unique is that the present invention is neither molded nor made from metal. It is entirely extruded as one piece. This process makes it unique as it is the only one that solely utilizes the extrusion process to create it. The part 10 is produced by extruding a plurality of different predetermined materials together, e.g., two or three or more different materials together. By utilizing the extrusion process, the part is less costly to process and the cost of tooling is vastly reduced. While this in itself, makes it unique to the industry, there are other key features that separate it from traditional running boards. It is extruded with multiple materials allowing for improved performance and aesthetics. The support ribs 12 can be comprised of predetermined reinforced material for strength (e.g., carbon fiber or fiberglass filled polypropylene). The predetermined thickness of these ribs 12 can be adjusted to meet specific weight and performance demands and specific predetermined customer requirements. The top cap 16 can be comprised of a third material (e.g., soft grade TPV/TPO). This would allow for grip, aesthetics, and wear resistance. The soft material is co-extruded on, which would be a far superior bond to that of a metal running board with a soft molded piece snapped or taped on.

By way of non-limiting example, the process provides a tri-durometer extruded running board. According to aspects of the present invention, the plurality of ribs 12, preferably central substantially vertical ribs, are formed of a different material than the main body 14 and/or cap 16, to allow the use of and interchangeability of various predetermined unique materials of the ribs 12 depending on particular applications without changing the other material or the other two materials (triple durometer die).

While three materials are described, it is understood that more or less than three materials is contemplated depending on the application without departure from the present invention. It is understood that suitable materials can be chosen depending on the application without departure from the present invention. It is understood that alternative locations for respective predetermined materials are contemplated depending on the application without departure from the present invention.

The main body 14 may be glass filled polypropylene with TPV about 50 Shore D skin coat, according to aspects of the present invention. According to preferred aspects of the present invention, the main body 14 is filled polypropylene (e.g., having about 60 shore D durometer). The plurality of ribs 12 are preferably the same material as the main body 14, according to aspects of the present invention. Cap layer 16 is preferably scratch resistant TPO (thermoplastic elastomer) or TPV (thermoplastic vulcanizate), e.g., having about 60-95 shore A durometer.

The extruded running board 10 is operably adapted to couple to the vehicle, e.g., using at least one fastener, at least one bolt, at least one mounting bracket, a plurality of metal brackets, etc. According to aspects of the present invention, the extruded running board 10 is operably adapted to be fixed to the vehicle, e.g., with a plurality of metal mounting brackets. The main body 14 is operably adapted to connect to mounting brackets with at least one fastener, e.g., at least one bolt within at least one aperture provided in the main body 14 and corresponding mounting bracket.

In accordance with the present invention, optionally, at least one trim of predetermined material(s) is/are operably connected to the extruded running board 10, (e.g., end cap(s), side trim(s), accent trim, front/rear end caps, molded plastic end caps, 3-dimensional printed end caps, roll-form stainless steel accent trim, stamped accent trim, stamped trim with embossed design and/or silk screening with predetermined graphics and/or colors, extruded trim(s), extruded end caps, and etc.) the extruded running board 10 being operably adapted to connect to the at least one trim depending on the particular application without departure from the scope of the present invention. It is understood that, alternatively the at least one trim is integrally formed with the extruded running board, e.g., with the main body 14. The extruded running board 10, preferably, the main body 14, is adaptable to incorporate at least one fastener for the end caps, e.g., bolts, and/or locating tabs to align and operably couple the end caps to the extruded running board 10, snap fit fasteners, aperture to receive a tab or fastening feature, interlocking channels, adhesive, etc. and any combinations thereof.

Optionally, at least one substantially vertical aero trim, ledge, flange or other suitable aero feature is operably connected to, or integrally formed with, the main body 14 and/or cap 16 of the extruded running board 10. By way of non-limiting example, a substantially vertical upper aero trim to help block or redirect wind flow from entering any gap between the extruded running board 10 and vehicle body for improved vehicle aerodynamics.

In accordance to aspect of the present invention, at least one extruder tool is provided and at least one predetermined cutting tool operably adapted to cut each formed extruded running board to predetermined length depending on the particular application.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of manufacturing a running board adapted for a vehicle, comprising:
   providing at least one tri-durometer extruder tool;
   providing a plurality of predetermined extrudable materials, wherein at least one of the materials is reinforced for strength, comprising at least three of said plurality of predetermined extrudable materials, wherein said main body, said at least one cap layer, and said at least one central rib are different materials and/or durometers from each other, and wherein at least said at least one central rib is reinforced material;
   extruding said plurality of predetermined extrudable materials forming a main body, at least one central rib section within a central cavity of said main body, and at least one cap layer, wherein said at least one central rib is a different material than said main body and is a reinforced material.

2. The method of claim 1, wherein said reinforced material is a glass filled polypropylene of at least about 60 Shore D durometer.

3. The method of claim 1, wherein said at least one cap layer is a scratch-resistant thermoplastic elastomer or thermoplastic vulcanizate.

4. The method of claim 1, wherein said cap layer predetermined extrudable material has a durometer of at least about 60 to 95 Shore A.

5. The method of claim 1, further comprising operably cutting said extruded running board to predetermined length.

* * * * *